United States Patent
Theisen

(10) Patent No.: US 7,933,702 B2
(45) Date of Patent: Apr. 26, 2011

(54) METHOD FOR ACTIVATING A RESTRAINT SYSTEM IN A VEHICLE

(75) Inventor: Marc Theisen, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 652 days.

(21) Appl. No.: 10/512,756

(22) PCT Filed: May 30, 2003

(86) PCT No.: PCT/DE03/01775
§ 371 (c)(1),
(2), (4) Date: Oct. 25, 2004

(87) PCT Pub. No.: WO2004/030999
PCT Pub. Date: Apr. 15, 2004

(65) Prior Publication Data
US 2005/0143886 A1 Jun. 30, 2005

(30) Foreign Application Priority Data
Oct. 1, 2002 (DE) .................................. 102 45 781

(51) Int. Cl.
*B60R 21/00* (2006.01)
*B60R 21/01* (2006.01)
*B60R 22/00* (2006.01)

(52) U.S. Cl. .............. 701/45; 701/46; 701/47; 180/274; 180/281

(58) Field of Classification Search ................ 701/1, 29, 701/35, 36, 45–48, 300, 301; 180/271, 274–277, 180/281–286; 340/436–467, 901–903
See application file for complete search history.

(56) References Cited

U.S. PATENT DOCUMENTS

| | | | |
|---|---|---|---|
| 3,741,584 A * | 6/1973 | Arai | 280/735 |
| 3,851,305 A * | 11/1974 | Baba et al. | 180/274 |
| 5,014,810 A | 5/1991 | Henne et al. | |
| 5,262,949 A * | 11/1993 | Okano et al. | 701/46 |
| 5,363,301 A * | 11/1994 | Takeuchi | 701/46 |
| 5,394,328 A | 2/1995 | Huang | |
| 5,411,289 A * | 5/1995 | Smith et al. | 280/735 |
| 5,513,108 A * | 4/1996 | Kishimoto et al. | 701/38 |
| 5,540,461 A * | 7/1996 | Nitschke et al. | 280/735 |
| 5,544,915 A * | 8/1996 | Fendt et al. | 280/735 |
| 5,546,307 A * | 8/1996 | Mazur et al. | 701/46 |
| 5,572,428 A * | 11/1996 | Ishida et al. | 701/301 |
| 5,587,906 A * | 12/1996 | McIver et al. | 701/36 |
| 5,613,039 A * | 3/1997 | Wang et al. | 706/24 |

(Continued)

FOREIGN PATENT DOCUMENTS
DE 197 24 101 12/1998

*Primary Examiner* — Jack Keith
*Assistant Examiner* — Jonathan M Dager
(74) *Attorney, Agent, or Firm* — Kenyon & Kenyon LLP

(57) ABSTRACT

A method for activating a restraint system in a vehicle, in which the restraint system is activated as a function of a speed, an activation characteristic, and at least one quantity derived from an acceleration signal, and in which the at least one quantity exceeds a threshold function that is set as a function of the impact speed and a required activation time. The activation characteristic of a particular accident type runs linearly to a first impact speed value. The activation characteristic runs with a second slope between the first impact speed and a second impact speed value, the first and the second impact speed value depending on the particular vehicle type.

5 Claims, 1 Drawing Sheet

U.S. PATENT DOCUMENTS

| | | | |
|---|---|---|---|
| 5,746,444 A * | 5/1998 | Foo et al. | 280/735 |
| 5,802,480 A * | 9/1998 | Shiraishi | 701/45 |
| 5,809,439 A * | 9/1998 | Damisch | 701/45 |
| 5,815,393 A * | 9/1998 | Chae | 701/39 |
| 5,964,817 A * | 10/1999 | Dalum et al. | 701/45 |
| 5,999,871 A * | 12/1999 | Liu | 701/45 |
| 6,012,008 A * | 1/2000 | Scully | 701/45 |
| 6,031,484 A * | 2/2000 | Bullinger et al. | 342/72 |
| 6,157,880 A * | 12/2000 | de Mersseman et al. | 701/45 |
| 6,186,539 B1 * | 2/2001 | Foo et al. | 280/735 |
| 6,198,997 B1 * | 3/2001 | Ishikawa et al. | 701/45 |
| 6,199,903 B1 * | 3/2001 | Brambilla et al. | 280/735 |
| 6,218,738 B1 * | 4/2001 | Fujishima | 307/10.1 |
| 6,219,605 B1 * | 4/2001 | Bauer et al. | 701/45 |
| 6,275,755 B1 * | 8/2001 | Mon et al. | 701/45 |
| 6,278,924 B1 * | 8/2001 | Gioutsos et al. | 701/45 |
| 6,295,495 B1 * | 9/2001 | Morman et al. | 701/45 |
| 6,301,535 B1 * | 10/2001 | Nusholtz et al. | 701/45 |
| 6,327,527 B1 * | 12/2001 | Imai et al. | 701/45 |
| 6,327,528 B1 * | 12/2001 | Vallette et al. | 701/45 |
| 6,330,500 B1 * | 12/2001 | Moriyama et al. | 701/45 |
| 6,394,495 B1 * | 5/2002 | Specht | 280/806 |
| 6,397,129 B1 * | 5/2002 | Lanoix et al. | 701/19 |
| 6,421,591 B1 * | 7/2002 | Hackenberg | 701/45 |
| 6,512,969 B1 * | 1/2003 | Wang | 701/45 |
| 6,549,836 B1 * | 4/2003 | Yeh et al. | 701/45 |
| 6,644,688 B1 * | 11/2003 | Hu et al. | 280/735 |
| 6,662,092 B2 * | 12/2003 | Wang et al. | 701/45 |
| 6,729,646 B1 * | 5/2004 | Morell | 280/735 |
| 6,816,766 B2 * | 11/2004 | Sala et al. | 701/45 |
| 7,036,845 B2 * | 5/2006 | Bentele-Calvoer et al. | 280/735 |
| 2001/0007963 A1 * | 7/2001 | Ugusa et al. | 701/49 |
| 2002/0016658 A1 * | 2/2002 | Imai et al. | 701/45 |
| 2002/0045456 A1 * | 4/2002 | Obradovich | 455/457 |
| 2002/0091479 A1 * | 7/2002 | Maruko et al. | 701/96 |
| 2002/0145273 A1 * | 10/2002 | Foo et al. | 280/735 |
| 2002/0147533 A1 * | 10/2002 | Foo et al. | 701/45 |
| 2002/0169535 A1 * | 11/2002 | Imai et al. | 701/45 |
| 2003/0023360 A1 * | 1/2003 | McConnell | 701/45 |
| 2003/0051530 A1 * | 3/2003 | Eisele et al. | 73/12.09 |
| 2003/0055563 A1 * | 3/2003 | Jonas Lars et al. | 701/301 |
| 2003/0074111 A1 * | 4/2003 | Ugusa et al. | 701/1 |
| 2003/0097212 A1 * | 5/2003 | Feser et al. | 701/45 |
| 2003/0105569 A1 * | 6/2003 | Roelleke | 701/45 |
| 2003/0120408 A1 * | 6/2003 | Caruso et al. | 701/45 |
| 2003/0139866 A1 * | 7/2003 | Frimberger et al. | 701/45 |
| 2003/0139883 A1 * | 7/2003 | Takafuji et al. | 701/301 |
| 2003/0146869 A1 * | 8/2003 | Lin et al. | 342/357.14 |
| 2003/0182041 A1 * | 9/2003 | Watson | 701/45 |
| 2003/0182042 A1 * | 9/2003 | Watson et al. | 701/45 |
| 2004/0051632 A1 * | 3/2004 | Sala et al. | 340/436 |
| 2005/0010346 A1 * | 1/2005 | Link et al. | 701/45 |
| 2005/0192731 A1 * | 9/2005 | Eisele et al. | 701/45 |

* cited by examiner

US 7,933,702 B2

METHOD FOR ACTIVATING A RESTRAINT SYSTEM IN A VEHICLE

FIELD OF THE INVENTION

The present invention relates to a method for activating a restraint system in a vehicle.

BACKGROUND INFORMATION

A method for activating a restraint system in a vehicle is discussed in published unexamined German patent application document no. 197 24 101. In this context, the crash severity is estimated from the impact speed and vehicle stiffness data is taken into consideration, activation ultimately occurring as a function of a comparison of a threshold function and an acceleration signal or a quantity derived therefrom. The threshold function is determined according to an activation characteristic determined from crash tests for the particular vehicle.

SUMMARY OF THE INVENTION

In contrast, the exemplary method of the present invention for activating a restraint system in a vehicle, having the features of the independent claim has the advantage that the activation times for quick and hard crashes are determined in an improved manner in accordance with the requirements, the transferability of activation performance to crash types or accident types in particular being able to be ensured with fewer crash tests. The core of the exemplary method is that there is a vehicle-dependent speed limit G after which a linear regression line no longer effectively describes the activation performance of the airbag. These linear regression lines are identified in crash tests and are entered in a speed activation time diagram. In addition, there is a vehicle-dependent speed after which the restraint arrangement, apparatus or structure is either activated at a fixed instant or is not activated without detailed differentiation between the accident or crash type. The exemplary method of the present invention allows for transfering the activation performance from the knowledge of the activation performance in the lower speed range to the speed range between speed limit G and speed P. This designates a speed range between 70 and 130 km/h, for example.

It is believed that the measures and further refinements described herein provide advantageous improvements of the exemplary method for activating a restraint system described herein.

It may be particularly advantageous that the activation characteristic runs linearly between the first and the second impact speed value. The crash test performed at 15, 20, 25 to 70 km/h, for example, result in an activation characteristic having linear properties. Activation characteristic refers to the function that defines the relationship between impact speed and activation time for a given crash type. Every crash type may have its own activation characteristic. The activation characteristics may result from the requirements of the vehicle manufacturer. These requirements determine when the restraint arrangement, apparatus or structure, e.g. an airbag or a belt pretensioner, is to be activated in the event of a crash against a given barrier at a certain impact speed. In this context, crash and accident type refer for example to a front impact, an offset crash, a side impact, a rear impact, an impact against a hard barrier, an impact against a soft barrier, and a pole crash, as well as a rollover. Therefore, the accident type refers to the type of accident.

It may also be advantageous that a fixed activation time is used starting at second impact speed value (P). Starting at this impact speed, the crash is so hard that the restraint arrangement, apparatus or structure must be activated immediately.

Finally, it may also be advantageous that a device for activating a restraint system is provided with the exemplary method of the present invention, the device including in particular a control unit that is connected to the corresponding sensors, e.g. a pre-crash sensor for detecting the impact speed and an inertial sensor for detecting the acceleration during a crash. The control unit then controls the restraint system accordingly.

DETAILED DESCRIPTION

To control the restraint arrangement, apparatus or structure in a vehicle, the signal from an acceleration sensor or a plurality of acceleration sensors is evaluated. The values for this signal are determined from signal features. These values are compared with a threshold or a threshold function, and if they exceed this threshold, the restraint arrangement, apparatus or structure, e.g. a pyrotechnical belt pretensioner or a first or second-stage airbag, is activated. In the case of vehicles having a sensor for measuring impact speed, this threshold may be selected as a function of the impact speed. The characteristic of the threshold function depends on the vehicle characteristic. A grid lying in the speed activation time plane is needed to be able to establish the threshold function. Points of the grid are used as data points via which the threshold values are specified. This grid results from the activation characteristics explained in the following for certain speeds, the speed being 15, 20, 25, . . . , 70 km/h, for example.

As shown above, the activation characteristics are determined by linear regression lines in the currently used system. These lines result from the activation time required by the vehicle manufacturer for a performed crash test. The linear regression lines effectively describe the required activation performance in the speed range in which the crash tests are performed. Described less effectively is the performance in the higher speed range, i.e. for speeds between 70 and 130 km/h, and for quick, very hard crashes when the regression line provides very short activation times, e.g. less than 5 ms.

The activation performance in these crash situations is described better for example by a 1/x function or by an exponentially decreasing function. A regression analysis may be performed for these functions for crash types having numerous crash tests just like for the linear function. A disadvantage of these functions compared to the linear function may be that these functions may not be generalized as effectively for crash types having fewer crash tests.

The exemplary embodiment and/or exemplary method of the present invention provides for a vehicle-dependent speed limit G after which the linear regression line no longer effectively describes the activation performance of the airbag. In addition, there is a vehicle-dependent speed P starting at which the restraint arrangement, apparatus or structure is either activated at a fixed early instant or is not activated without detailed differentiation between the different crash types. The exemplary method described here provides for the transfer of the activation performance from the knowledge of the activation performance in the lower speed range to the speed range between speed limit G and speed P.

Figure 1:
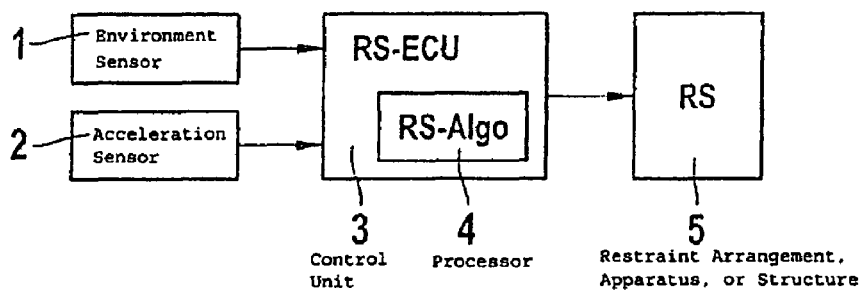
FIG. 1 shows a block diagram of the exemplary device of the present invention.

FIG. 1 shows a block diagram of the exemplary device of the present invention. An environment sensor 1 is connected via a first data input to a control unit 3. An acceleration sensor 2 is also connected to control unit 3 at a second data input. Control unit 3 is assigned a processor 4, on which an algorithm for calculating the activation times of a restraint arrangement, apparatus or structure runs. Additional algorithms for controlling other restraint arrangements may also be processed. Control unit 3 is connected via a data output to restraint arrangement, apparatus or structure 5. The restraint arrangement, apparatus or structure 5 may include for example airbags, belt pretensions, or a rollover bar and thus form the restraint system.

Restraint arrangement, apparatus or structure 5 may be controlled either by control unit 3 or by a further control unit for the restraint arrangement, apparatus or structure. Only one environment sensor 1 and one acceleration sensor 2 are mentioned here as examples. However, more than one environment sensor and more than one acceleration sensor may be used. Environment sensor 1 is a radar sensor or an ultrasound sensor or an optical sensor, for example. Acceleration sensor 2 is used as an impact sensor that determines the acceleration resulting from the impact.

The exemplary method represented in the following for determining the activation characteristics is the basis for the algorithm running in control unit 3. This method requires that the activation characteristics valid for the lower and middle speed range be given with respect to the crash type in question. There is a vehicle-dependent limit G after which the linear activation characteristics only insufficiently describe the activation performance for higher speeds. The position of limit G also depends on the crash type. Therefore, it may be represented as a straight progression or as any other mathematical function in the speed activation time plane. For example, the limit may be selected such that it is essentially above the crash tests performed by the vehicle manufacturer.

The linear activation characteristics effectively describe the activation performance for speeds below this limit. There is also a vehicle-dependent speed $V_{max}$, starting at which the restraint arrangement, apparatus or structure to be controlled is either activated at a fixed, early instant or is not activated regardless of the crash type. Starting at this speed $V_{max}$, there is therefore only this instant $T_{max}$ for the activation decision and no real time interval as for lower speeds. The activation characteristics for every crash type may be specified for the speed range between this point $P_{max}$ and previously described limit G as follows for example: A line is selected between $P_{max}$ and point of intersection $S_{Crash-Type}$. Point $S_{Crash-Type}$ results as the point of intersection between limit G and the activation characteristic in the lower speed range for the crash type in question.

Knowledge extracted from the crash test data is represented in the activation characteristics from the lower speed range. Since the activation characteristics are used to define points of intersection $S_{Crash-Type}$, the knowledge extracted from the crash tests is generalized for the top speed range. In addition, this sectionally linear approach allows the activation characteristics to also be generalized for crash types having fewer available crash tests. Moreover, this sectional approach has the advantage that the activation characteristics are selected to be steeper for the higher speed range than for the lower one. As a result, the characteristic curve corresponds better with the ideal, initially steep, then flatter curve. Therefore, the exemplary method of the present invention represents an optimum compromise between the transferability to other crash types and the quality of the description of the activation performance.

Figure 2:
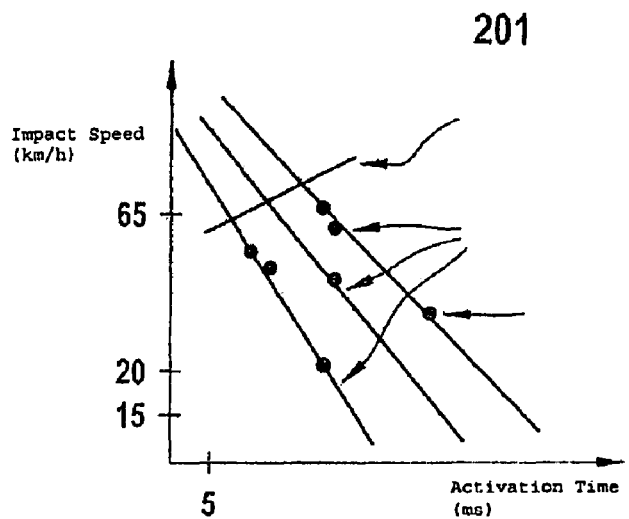
FIG. 2 shows an impact speed activation time diagram.

FIG. 2 uses a speed activation time diagram to show the regression lines that describe the activation characteristics and are determined in different crash tests. The activation time is plotted in ms on the abscissa while the impact speed is indicated in km/h on the ordinate. Three linear regression lines drawn through measuring points for crash tests are shown here. Starting at limit 201, the activation characteristics defined by the regression lines are no longer valid since the impact speed here is such that there are other properties. Significantly shorter activation times are to be provided in this case.

Figure 3:
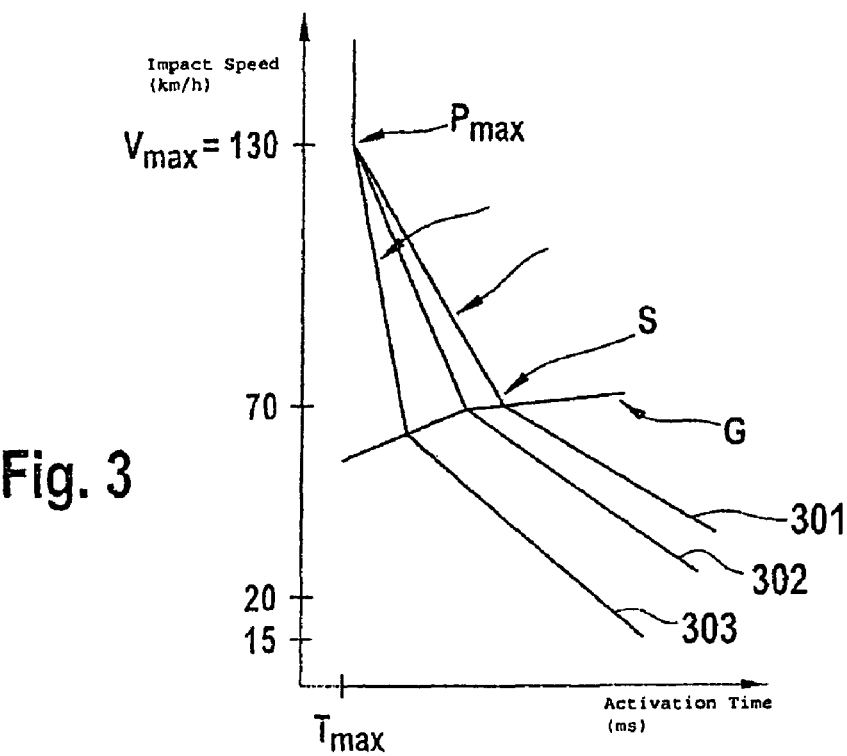
FIG. 3 shows a further impact speed activation time diagram.

FIG. 3 uses another speed activation time diagram to show the use of the impact speed values according to the exemplary embodiment and/or exemplary method of the present invention to control the activation performance accordingly. The activation time is plotted in ms on the abscissa while the impact speed is indicated in km/h on the ordinate. Three regression lines 301, 302, 303 are specified for three accident types. As soon as they intersect curve G, which defines the speed limit after which these regression lines no longer describe the required activation performance with sufficient accuracy, the slope of the individual regression lines changes. The slope changes such that they meet at point $P_{max}$, which lies at 130 km/h in this instance, and after this speed a fixed activation time is provided. The range between speed limit G and point $P_{max}$ for the individual regression lines may also be interpolated by other curves, which then however entails greater calculational effort. The left regression line describes the earliest activation characteristic while right regression line 301 indicates the latest activation characteristics.

What is claimed is:

1. A method for activating a restraint system in a vehicle, the method comprising:
   calculating an activation time using an activation characteristic defining a relationship between an impact speed value and the activation time; and
   activating the restraint system according to the activation time,
   wherein the activation characteristic is particular to an accident type and is linear with a first slope to a first impact speed value, and the activation characteristic has at least one second slope between the first impact speed value and a second impact speed value, the second slope being different from the first slope, the first impact speed value and the second impact speed value being particular to an accident type,
   wherein there are at least two regression lines specified to an accident type, and
   wherein the at least two regression lines intersect a curve that defines the speed limit after which these regression lines no longer describe the required activation performance with sufficient accuracy, a slope of each of the at least two regression lines changes.

2. The method of claim 1, wherein the activation characteristic between the first impact speed value and the second impact speed value is linear.

3. The method of claim 1, wherein a fixed activation time is used starting at the second impact speed value.

4. The method of claim 2, wherein a fixed activation time is used starting at the second impact speed value.

5. The method of claim 1, wherein the slope changes such that the at least two regression lines meet at a point associated with a speed, after which speed is exceeded a fixed activation time is provided.

* * * * *